(12) United States Patent
Milanese et al.

(10) Patent No.: US 9,366,225 B2
(45) Date of Patent: Jun. 14, 2016

(54) ACTUATING SYSTEMS FOR CONTROLLING THE FLIGHT OF A POWER WING PROFILE FOR CONVERSION OF WIND ENERGY INTO ELECTRICAL OR MECHANICAL ENERGY

(75) Inventors: Mario Milanese, Turin (IT); Lorenzo Fagiano, Turin (IT); Ilario Gerlero, Turin (IT)

(73) Assignee: KITENERGY S.R.L., Turin (IT)

( * ) Notice: Subject to any disclaimer, the term of this patent is extended or adjusted under 35 U.S.C. 154(b) by 927 days.

(21) Appl. No.: 13/638,709

(22) PCT Filed: Mar. 30, 2011

(86) PCT No.: PCT/IB2011/051364
§ 371 (c)(1),
(2), (4) Date: Dec. 5, 2012

(87) PCT Pub. No.: WO2011/121557
PCT Pub. Date: Oct. 6, 2011

(65) Prior Publication Data
US 2013/0078097 A1    Mar. 28, 2013

(30) Foreign Application Priority Data

Mar. 31, 2010    (IT) .............................. TO2010A0258

(51) Int. Cl.
*A63H 27/00*    (2006.01)
*F03D 5/00*    (2006.01)
(Continued)

(52) U.S. Cl.
CPC .. *F03D 5/00* (2013.01); *F03D 5/06* (2013.01); *F03D 7/00* (2013.01); *Y02E 10/70* (2013.01); *Y02E 10/723* (2013.01)

(58) Field of Classification Search
CPC .. B63B 35/7979; A63H 27/087; A53H 27/08; B64F 1/14; B64B 1/40; Y02E 10/723; Y02E 10/70; B60W 10/08; E04H 17/266; B60R 22/44; B65H 75/4402; B66D 1/36; B66D 1/26; B66D 1/22; F03D 5/00; F03D 5/06
USPC ................ 244/155 A, 155 R, 153 R, 115, 33; 290/44, 45; 242/390, 390.8, 397.2, 242/397.3; 254/297, 344
See application file for complete search history.

(56) References Cited

U.S. PATENT DOCUMENTS 3,005,604 A * 10/1961 McDonald ................ B64B 1/62
244/33
3,807,577 A * 4/1974 Bell ........................ B66C 21/00
104/173.1

(Continued)

FOREIGN PATENT DOCUMENTS

DE    102004018814 A1    11/2005
EP    1672214 A1    6/2006

(Continued)

OTHER PUBLICATIONS

PCT/ISA/220 Notification of Transmittal of the International Search Report and the Written Opinion of the International Searching Authority, or the Declaration, mailed on Sep. 27, 2011, for corresponding PCT International Application No. PCT/IB2011/051364, with PCT/ISA/210 International Search Report and PCT/ISA/237 Written Opinion of the International Searching Authority, completed on Sep. 8, 2011.

*Primary Examiner* — Medhat Badawi
*Assistant Examiner* — Assres H Woldemaryam
(74) *Attorney, Agent, or Firm* — Heslin Rothenberg Farley & Mesiti P.C.; Victor A. Cardona, Esq.

(57) ABSTRACT

An actuating system for controlling the flight of a power wing profile or kite controlled via at least two cables for conversion of wind energy into electrical or mechanical energy, includes a first unit for exerting an action of unwinding-winding of the cables to the same extent, and a second unit set between the power kite and the first unit for providing an action of differential control of the cables. The system employs a single motor or motor/generator.

20 Claims, 5 Drawing Sheets

(51) Int. Cl.
  *F03D 5/06*    (2006.01)
  *F03D 7/00*    (2006.01)

(56) References Cited

U.S. PATENT DOCUMENTS

| | | | | |
|---|---|---|---|---|
| 3,865,251 | A * | 2/1975 | Langford | B66C 21/00 |
| | | | | 212/71 |
| 4,076,190 | A | 2/1978 | Lois | |
| 4,251,040 | A | 2/1981 | Loyd | |
| 5,056,447 | A | 10/1991 | Labrador | |
| 5,435,259 | A | 7/1995 | Labrador | |
| 6,010,093 | A * | 1/2000 | Paulson | B64B 1/50 |
| | | | | 244/24 |
| 6,254,034 | B1 * | 7/2001 | Carpenter | A63H 27/08 |
| | | | | 244/153 R |
| 6,575,403 | B1 * | 6/2003 | Monroe | B64B 1/70 |
| | | | | 244/31 |
| 6,914,345 | B2 | 7/2005 | Webster | |
| 2004/0035345 | A1 | 2/2004 | Lundgren | |
| 2004/0200396 | A1 | 10/2004 | Page, Jr. | |
| 2009/0072092 | A1 * | 3/2009 | Griffith | B64C 31/06 |
| | | | | 244/155 A |
| 2009/0097974 | A1 * | 4/2009 | Ippolito | B63H 9/0685 |
| | | | | 416/31 |
| 2010/0019091 | A1 * | 1/2010 | Milanese | B63B 35/7979 |
| | | | | 244/155 A |
| 2015/0175277 | A1 * | 6/2015 | Hachtmann | B64F 3/00 |
| | | | | 244/153 R |

FOREIGN PATENT DOCUMENTS

| | | | |
|---|---|---|---|
| EP | 1672214 B1 | 2/2008 | |
| GB | 2098946 A | 12/1982 | |
| GB | 2098951 A | 12/1982 | |
| IT | TO 2003 A 000945 | 11/2003 | |
| IT | WO 2008072269 A1 * | 6/2008 | B63B 35/7979 |
| WO | WO 03/097448 A1 | 11/2003 | |
| WO | WO 2005/100147 A1 | 10/2005 | |
| WO | WO 2005/100148 A1 | 10/2005 | |
| WO | WO 2005/100149 A1 | 10/2005 | |
| WO | WO 2007/122650 A1 | 11/2007 | |
| WO | WO 2008/072269 A1 | 6/2008 | |

* cited by examiner

ACTUATING SYSTEMS FOR CONTROLLING THE FLIGHT OF A POWER WING PROFILE FOR CONVERSION OF WIND ENERGY INTO ELECTRICAL OR MECHANICAL ENERGY

CROSS-REFERENCE TO RELATED APPLICATIONS

This application is a 371 National Phase of PCT International Application No. PCT/IB2011/051364 filed on Mar. 30, 2011, and published in English as WO 2011/121557 A2 on Oct. 6, 2011, which claims priority to Italian Patent Application No. TO2010A000258 filed on Mar. 31, 2010, the entire disclosures of which are incorporated herein by reference.

FIELD OF THE INVENTION

The present invention regards a first system for implementing the commands of an appropriate control system, whether automatic or manual, of flight of a power wing profile or kite, in particular for conversion of wind energy into electrical or mechanical energy through the flight of the aforesaid power kite connected by means of two cables to conversion devices on the ground. The aforesaid first system for implementing the commands is located on the ground, and the command considered can amount to a difference of length of the two cables.

The present invention moreover regards a second system for implementing the commands of an appropriate control system, whether automatic or manual, of flight of a power wing profile or kite, in particular for conversion of wind energy into electrical or mechanical energy through the flight of the aforesaid power kite connected by means of one or more cables to conversion devices on the ground. The aforesaid second system for implementing the commands is set on board the kite, and the command considered can amount to a variation of angle of attack of the kite or else to a variation of the effective area of the kite, or else to a variation of the geometry of the kite such as to generate appropriate aerodynamic forces and momenta on the kite itself, or else to more than one of the aforesaid effects simultaneously.

The present invention moreover regards management of lifting off the ground and recall to the ground of the power kites, in particular for the conversion of wind energy into electrical or mechanical energy through the flight of the aforesaid power kite connected by means of at least one cable to conversion devices on the ground.

PRIOR ART

Known from some prior patents are processes of conversion of wind energy into electrical or mechanical energy by means of devices that are able to convert the mechanical energy generated by the wind source into another form of energy, typically electrical energy, which subtract energy from the wind using power kites connected to said devices by means of cables. For example, the U.S. Pat. No. 4,076,190, U.S. Pat. No. 4,251,040, U.S. Pat. No. 6,254,034 B1, and U.S. Pat. No. 6,914,345 B2, the U.S. patent application No. US 20090072092, the Italian patent application No. TO2003A000945, and the European patent application No. EP 04028646.0 describe systems for converting the kinetic energy of wind currents into electrical energy by means of the control of flight of power kites connected to the ground via one or more cables. Likewise known are systems for converting the kinetic energy of wind currents into electrical energy, in which at least one kite is connected by means of cables to a unit for manoeuvring and generating energy fixed on the ground: in said systems, the kite is carried cyclically through a pulling phase where it ascends pushed by the wind, and during which unwinding of the cables sets in rotation a generator of the unit on the ground designed for generating electrical energy, and a recovery phase in which the kite is recovered and then manoeuvred so as to capture the wind once again.

In other known solutions, the energy is converted maintaining the length of the cables fixed and causing the forces exerted on the cables to bring about translation, along a preset cyclic path, of a ground unit provided with wheels connected to electric generators.

In the past, there have also been proposed various solutions regarding towing of watercraft by means of devices that capture the wind currents via power kites, like the ones described in particular in the British patent No. GB 2.098.951, in the U.S. Pat. No. 5,056,447, in the U.S. Pat. No. 5,435,259, in the international patent No. WO03097448, in the U.S. patent application No. US2004035345, in the U.S. patent application No. US2004200396, in the international patent No. WO2005100147, in the international patent No. WO2005100148, in the international patent No. WO2005100149, and in the German patent application No. DE102004018814.

In some of the systems referred to, the kite is constrained with two cables to the ground and is controlled by imposing a difference of length, referred to hereinafter as "differential", between the two cables. The aforesaid systems use an actuation unit located on the ground, the tasks of which are substantially of two types: unwinding or winding of the two cables to the same extent and imposition of a differential. A modality of imposition of a differential already proposed by the prior art is the one that consists in entrusting with the task of imposing a given value of differential two independent electric motors/generators, each connected to a winch over which the respective cable is run. Another solution is proposed in the international patent application No. WO-2008/072269, which presents an embodiment aimed at decoupling the functions of control of the differential and of winding/unwinding of the cables to the same extent. Said invention is constituted by at least one first actuator motor dedicated to implementing the differential, and by at least one second actuator motor dedicated to unwinding/winding of the cables to the same extent.

SUMMARY OF THE INVENTION

The present invention proposes improved and more efficient solutions as compared to the known ones, the basic common characteristic of which is defined in claim 1.

In a first embodiment, a single low-power motor is used, and in a second embodiment a single high-power motor/generator is provided flanked by a system for accumulation and transmission of energy. The first solution is devised specifically for generating systems operating with a fixed length of the cables, whilst the second solution is devised specifically for generating systems that exploit cyclic winding and unwinding of the cables. In both types of generators, with fixed cable or variable cable, the present invention is moreover characterized in that it proposes a system for gathering the cables that is able to wind the cables without stratification, with consequent lower wear of the cables and fewer problems of management of winding.

Furthermore, there would be considerable advantages in the control of the kite using a second actuation system, in addition to the first actuation system for implementing the differential, which is set on board the kite and is able to give rise to a variation of angle of attack of the kite or else to a variation of the effective area of the kite or else to a variation of the geometry of the kite such as to generate appropriate aerodynamic forces and momenta on the kite itself or else to more than one of the aforesaid effects simultaneously, according to the command calculated by an appropriate automatic-control system or else set by a human operator via an appropriate human-machine interface. In this regard, the present invention proposes a second actuation system, which is set on board the kite and is able to affect the flight of the kite, as described above.

Finally, an important aspect in the management of the aforementioned systems of conversion of wind energy into mechanical and electrical energy, via the flight of power kites, regards management of the steps of lift off the ground and of recall to the ground of the power kites. The present invention proposes two possible systems for tackling this type of problem.

The present invention hence proposes new and improved solutions as compared to the known ones according to the prior art by providing a first solution for a first system for implementing the differential command, located on the ground, specifically devised for generating systems operating with a fixed length of the cables, a second solution for a first system for implementing the differential command, located on the ground, specifically devised for generating systems operating with a cyclically variable length of the cables, a second system for implementing the commands, located on board the kite, a first possible solution and procedure for lifting off the ground and recall to the ground of rigid or semi-rigid power kites, a second possible solution and procedure for lifting off the ground and recall to the ground of rigid or semi-rigid power kites.

Preferred embodiments and original variants of the present invention form the subject of the dependent claims.

In the sequel of the description, it will be assumed that at least one kite is connected to the ground by means of at least two cables, with which it is possible to issue a command via differential.

BRIEF DESCRIPTION OF THE DRAWINGS

The present invention will be described more fully with reference to some preferred embodiments, provided by way of non-limiting example, with reference to the attached drawings, in which.

DETAILED DESCRIPTION OF THE INVENTION

Figure 1:
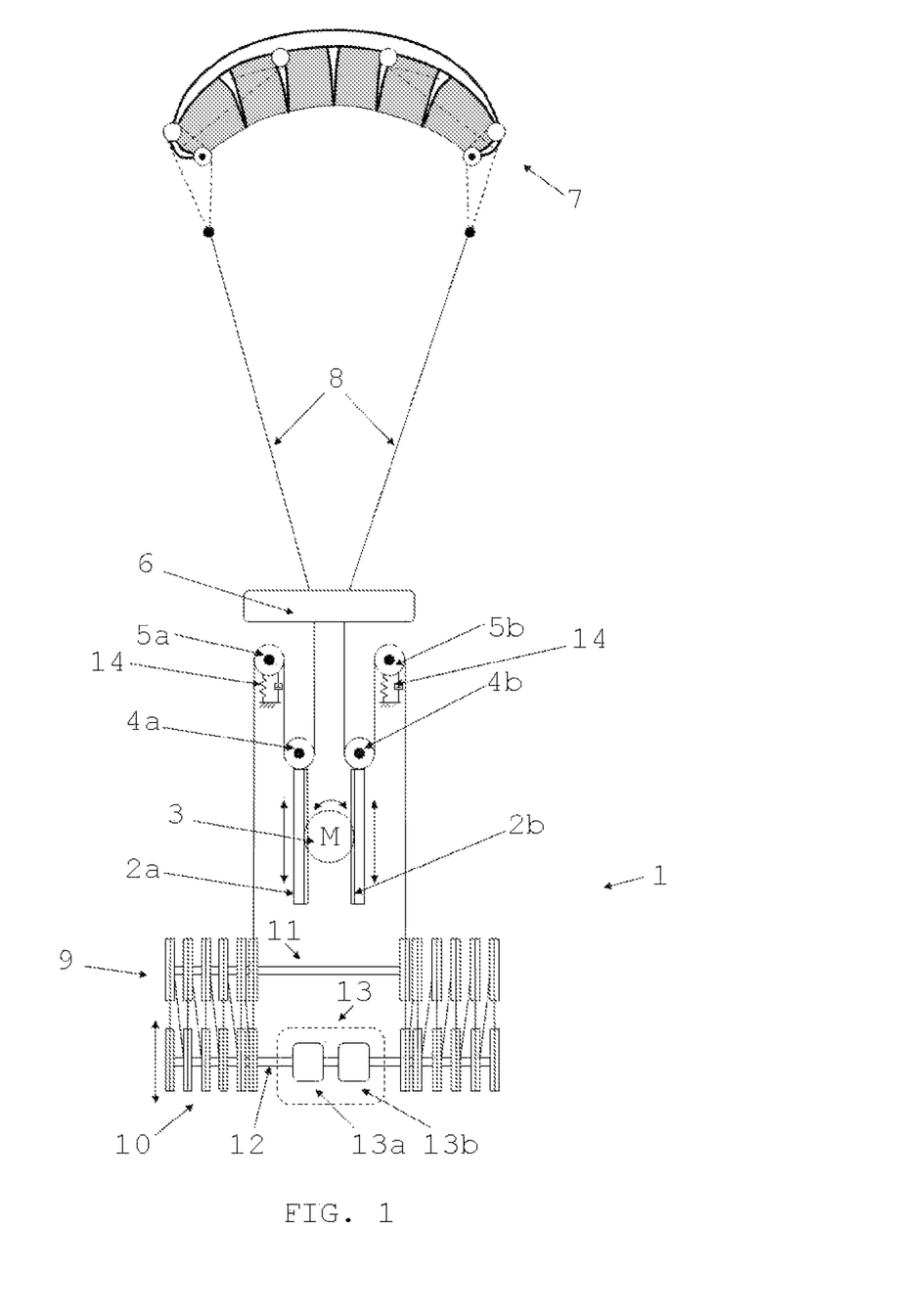
FIG. 1 is a schematic representation of a first solution for a first system for implementing the control of flight of power wing profiles or kites via differential, devised for generating systems operating with a fixed length of the cables.

With reference then to FIG. 1, it may be noted that in the first solution the first system 1 for implementing the control of flight, via differential, of at least one power wing profile or kite according to the present invention comprises:

a single actuator motor 3, which drives, via a gear (not illustrated) and respective racks, two slides 2a and 2b, fixed with respect to which are two return blocks, 4a and 4b respectively, through which the cables 8 pass after being sent back from the blocks 5a and 5b, the latter being, for example, fixed with respect to the ground or possibly connected to damping systems 14 or in any case not fixed with respect to the slides 2a and 2b;

a system 6 designed for tensioning the cables 8, damping the oscillations of force on the cables 8, and possibly measuring the forces acting on the cables 8 in the stretch between the return blocks 4a and 4b and the kite 7;

a series of pulleys 9, of a number, diameter, and width appropriately sized according to the diameter and the length of the cables 8, supported by a shaft 11;

a series of return pulleys 10, of a number, diameter and width appropriately sized according to the diameter and the length of the cables 8, supported by a shaft 12; the pulleys 10 and the shaft 12 are located underneath the pulleys 9 and the shaft 11, and are able to translate vertically, approaching or receding from said elements 9 and 11;

a system 13 of brake 13a and counterweight 13b, which is applied to the shaft 12 is also able to translate vertically as well as to block, via the brake 13a, the motion of translation of the shaft 12 with respect to the shaft 11; the weight of the counterweight 13b is variable, i.e., it can be selectively modulated as a function of the force that is to be obtained on the cables, for example via a water-tank system such as the ones known in the prior art and used for distributing the weights in boats.

It may be noted how the movement of the motor 3 gives rise to a difference between the lengths of the two cables 8, on the side of the kite 7, through the translatory motion of the slides 2a and 2b. For example, a rotation of the motor 3 in a clockwise direction in the scheme of embodiment illustrated by way of example in FIG. 1 leads to a shortening of the cable, on the side of the kite 7, that runs in the block 4b and simultaneously leads to a lengthening of the cable, on the side of the kite 7, that runs in the block 4a. With an appropriate command of the motor 3 it is consequently possible to issue the desired differential command. It is to be noted that the pulleys 9, the pulleys 10, the shaft 11, and the shaft 12 constitute a multiplication system via which a variation of length of the cables 8 on the side of the kite 7 results in a variation of a smaller amount of the distance between the shaft 12 and the shaft 11, with a ratio that can be calibrated according to the diameter and to the number of the pulleys 9 and 10. When the generation system is in normal operating conditions with fixed cable, the shaft 12 is blocked by the brake 13a so that the distance from the shaft 11 remains fixed and the cable 8 also remains at a fixed length even under the action of the tensile forces exerted by the kite. When it is necessary to rewind the cables, for example in the case of absence of wind or for maintenance purposes, the kite is manoeuvred so that the tensile forces on the cables are minimal and the system of counterweight 13a and brake 13b is released, causing recession of the shaft 12 from the shaft 11 and consequent rewinding of the cables. The subsequent unwinding of the cables, to return to the operating conditions, is performed thanks to the pull exerted by the kite in the presence of wind, such as to overcome the friction of the pulleys and the weight of the system of variable brake 13a and counterweight 13b.

Figure 2:
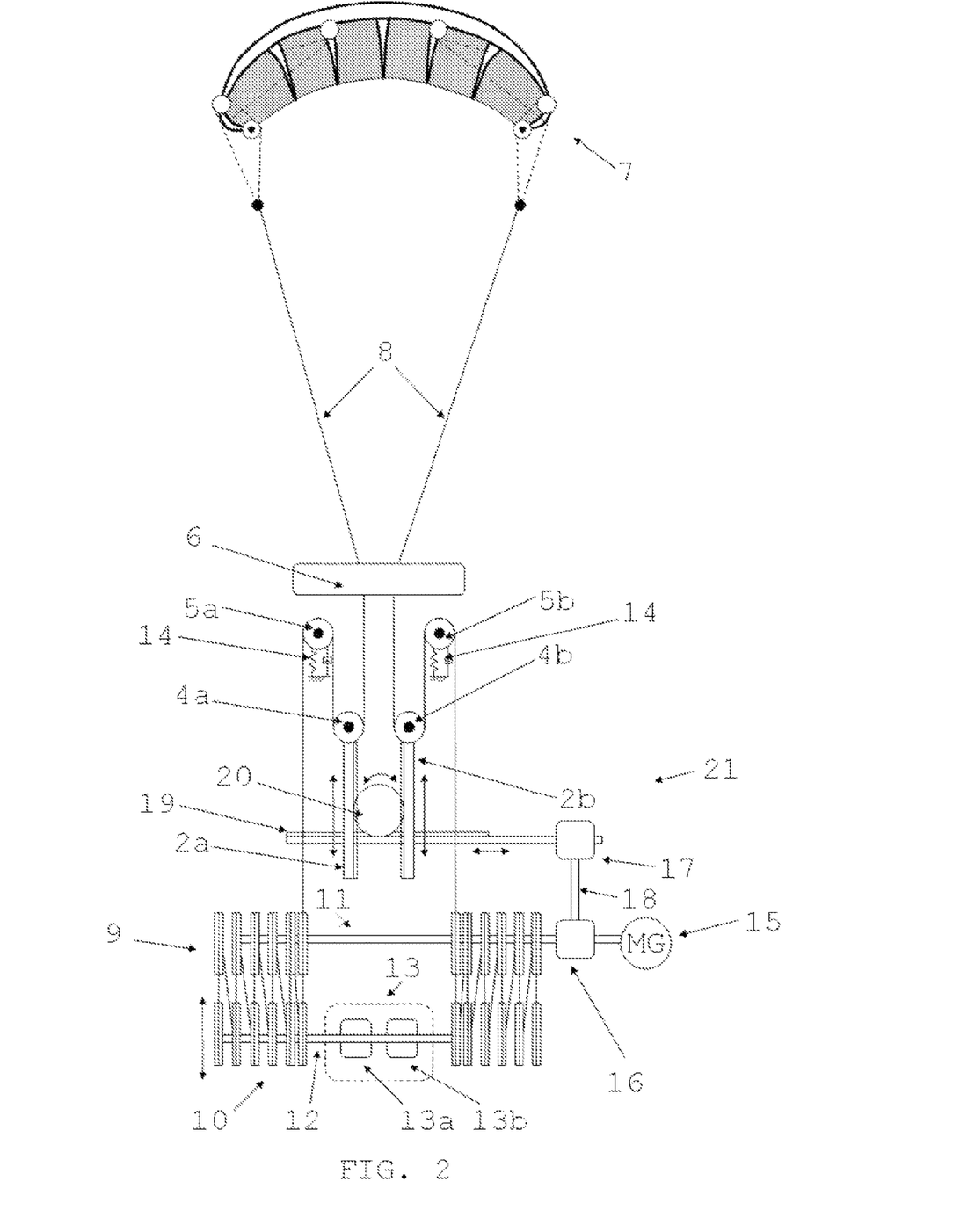
FIG. 2 is a schematic representation of a second solution for a first system for implementing the control of flight of power wing profiles or kites via differential, devised for generating systems operating with a cyclically variable length of the cables.

With reference now to FIG. 2, it may be noted that in a second solution specifically devised for generating systems with a cyclically variable length of the cables, the first system 21 for implementing control of flight, via differential, of at least one power wing profile or kite according to the present invention comprises the elements 2a, 2b, 4a, 4b, 5a, 5b, 6, 7, 8, 9, 10, 11, 12, 14 similar to the ones described previously with reference to FIG. 1, whilst the elements 3 and 13b are absent and the elements 15, 16, 17, 18, 19, 20 are additional. In particular, this second solution presents a system 16 of clutches that is able to connect and disconnect selectively and independently the shafts 11 and 18 to a single motor/generator 15. The motor/generator 15, if connected to the shaft 11, is able to generate power during unwinding of the cables and to supply power in the rewinding step. If connected to the shaft 18, the motor/generator 15 can moreover drive a system 17 for accumulation of energy, for example of a hydro-pneumatic type. The system 17 can for example be constituted by a compressor and a tank. Once a given pressure is reached, the system of clutches 16 disengages connection between the motor 15 and the shaft 18 until the accumulation of pressure in the system 17 is once again necessary. The system 17 also comprises an actuation system, for example with pneumatic valves, which is able to cause translation of the rack 19, engaged on the gear 20, which in turn meshes with the racks of the slides 2a and 2b. It is evident that a translation to the left in FIG. 2 of the rack 19 causes a clockwise rotation of the gear 20 and consequent increase in length of the left-hand cable and reduction in length of the right-hand cable, on the side of the kite 7, thus imposing the desired differential. In FIG. 2, the systems 16, 17, and 18 are not represented in detail in so far as they can be obtained with known techniques.

Figure 3:
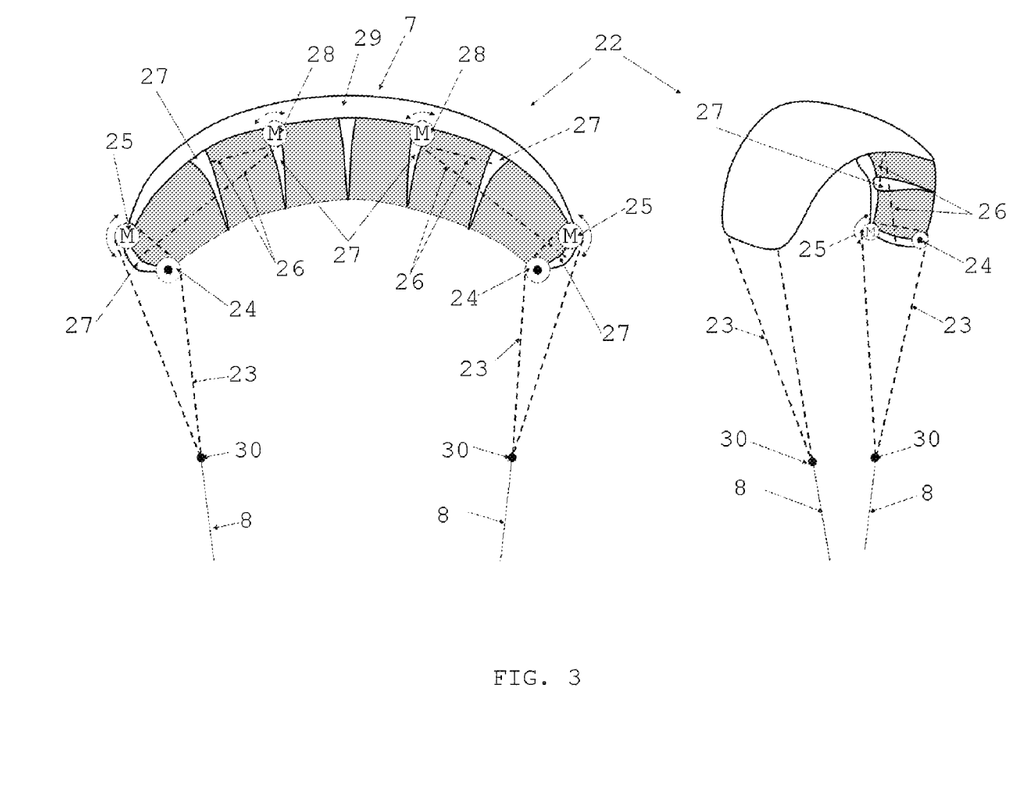
FIG. 3 is a schematic representation of a preferred embodiment of a second system for implementing the control of flight of power wing profiles or kites, which is located on the kite.

With reference now to FIG. 3, the second system 22 for implementing the control of flight of power wing profiles or kites according to the present invention, illustrated in FIG. 3 in two different perspective views, comprises:
at least two bridles 23, which are each constrained by the fixing element 30 to one of the two cables 8 and are purposely made so as to be able to run in the blocks 24. The bridles 23 are moved by the motors 25. A co-ordinated movement of the motors 25 leads to a variation of the adjustment of the bridles 23, increasing or reducing the angle of attack of the kite 7 as a function of the direction of rotation of the motors 25. In this way, it is possible to obtain a variation of the angle of attack of the kite 7. Furthermore, a rotation of the two motors 25 in opposite directions leads to two different adjustments for the bridles 23 of the kite 7, thus generating an aerodynamic moment that is able to cause rotation of the kite 7, thus modifying the trajectory thereof;
at least two series of at least two cords 26 each connected at one end to a structural element 27 of the kite 7 and at the other end to one of the at least two motors 28. The movement of the motors 28 causes winding or unwinding of the cords 26 and consequent approach or recession of the structural elements 27, leading to a variation of the shape and of the effective area of the kite 7. It may be noted that with unwinding of the cords 26, the structural elements 27 recede as a result of the aerodynamic forces acting on the kite 7.

The motors 25, 28 and the blocks 24 are appropriately constrained to the kite 7, for example via fixing to the structural element 29, which is also referred to as "leading edge". The leading edge 29 and the structural elements 27 are appropriately provided so as to enable the variation of shape and of effective area of the kite following upon the action of the motors 28, as described previously. The energy necessary for operation of the motors 28 is supplied by appropriate accumulation systems, possibly flanked by energy-generating systems on board the kite 7, for example wind microturbines and solar micropanels, as described also hereinafter.

With reference now to FIG. 4, it may be noted that a first system of lifting off the ground and recall to the ground of power wing profiles or kites is made up of at least one rigid or semi-rigid kite 7 connected to the cables 8 and provided with appropriate supporting systems 31, such as for example undercarriages with wheels already forming part of the prior art, which will enable the said kite 7 to move over the ground at a high speed with low friction. The kite 7 can be equipped with systems for implementing the commands like the ones described previously and/or be an unmanned aerial vehicle (UAV) according to solutions already present in the prior art.

Figure 4A:
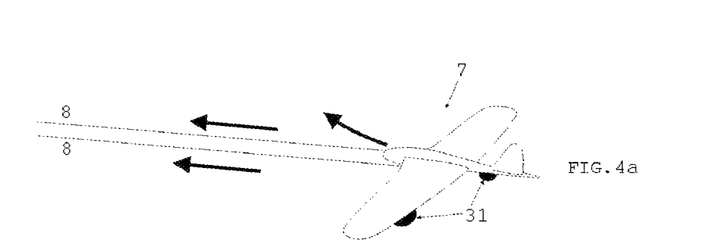
FIG. 4 is a schematic representation of a first possible solution and procedure for lifting off the ground and recall to the ground of rigid or semi-rigid power wing profiles or kites.
Figure 4B:
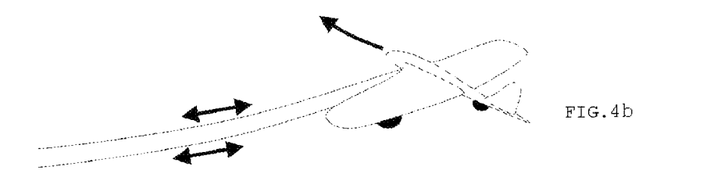
Figure 4C:
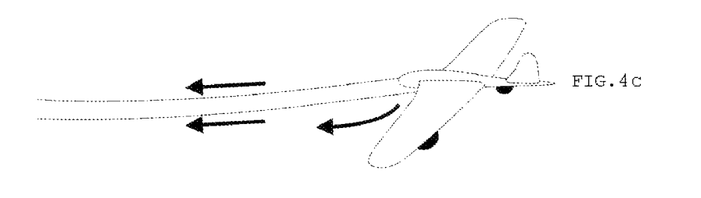

The step of lifting off the ground according to the present invention, represented schematically in FIG. 4, starts with the kite 7 on the ground and the cables 8 laid out on the ground (FIG. 4a). By unwinding the cables 8 at an appropriate rate, for example using systems like the ones envisaged in the two solutions of first system for implementing the commands presented previously, the kite 7 rises as a result of the force of lift that develops at the speed of winding of the cables. During flight (FIG. 4b), the kite is manoeuvred so as to provide generation of energy according to the modalities envisaged by the generator used, for example with fixed cable or variable cable, according to inventions like the ones cited previously and other solutions forming part of the prior art. In the step of recall (FIG. 4c), the kite 7 performs a landing whilst the cables 8 are rewound without exerting high tensile forces on the kite so as not to jeopardize landing, with consequent low consumption of energy. The first system for lifting off the ground and recall to the ground of power kites described above differs from the solutions already present in the prior art with just one cable thanks to the presence of two cables 8. The second cable serves to distribute the forces exerted by the power kite and to implement a command of the power kite via differential, such as for example via the first actuation system described previously in two possible embodiments with reference to FIG. 1 and to FIG. 2; finally, said second cable provides a higher degree of safety, making possible recovery of the power kite in the event of failure of one of the two cables.

Figure 5A:
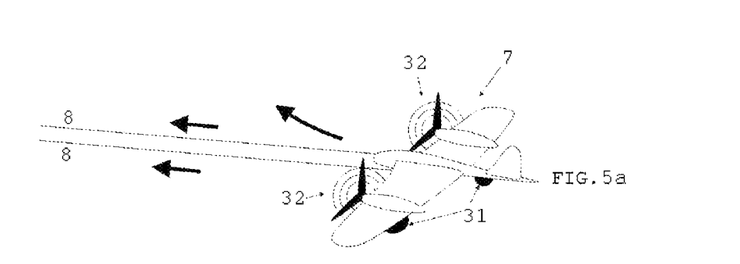
FIG. 5 is a schematic representation of a second possible solution and procedure for lifting off the ground and recall to the ground rigid or semi-rigid power wing profiles or kites.
Figure 5B:
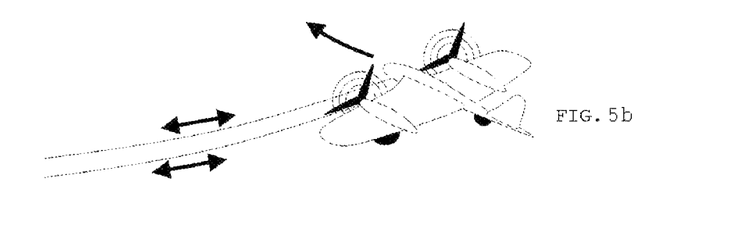
Figure 5C:
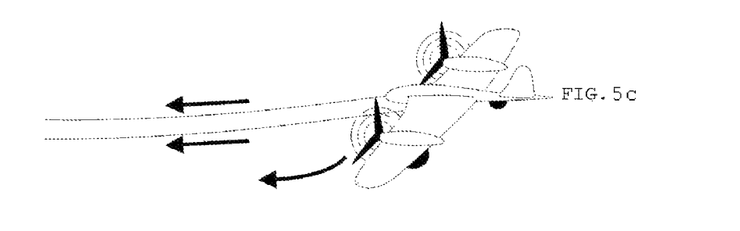

With reference now to FIG. 5, it may be noted that a second system of lifting off the ground and recall to the ground of power kites is made up of the elements 7, 8, 31 similar to the ones described previously in the first system of lifting off the ground and recall to the ground of power kites. Furthermore, the second system of lifting off the ground and recall to the ground of power kites is also made up of at least one propeller system 32 connected to an electric motor/generator, used for partial or total thrust during take-off (FIG. 5a), for generation of energy on board the kite during flight and for thrust of the kite during flight, if necessary (FIG. 5b), and finally for thrust of the kite during landing, if necessary (FIG. 5c).

Some embodiments of the invention have been described, but of course they may undergo further modifications and variations, all of which fall within the scope of the inventive idea itself.

The invention claimed is:
1. An actuating system for controlling the flight of a power wing profile or power kite controlled via at least two cables for conversion of wind energy into electrical or mechanical energy, comprising:
a first unit for exerting an action of equal unwinding-winding of said cables;

a second unit set between said power kite and said first unit for providing an action of differential control of said cables;

a single motor; and wherein said single motor is a motor/generator that drives both said first unit via coupling means that can be selectively engaged and disengaged and said second unit via an energy-accumulation system.

2. The system according to claim 1, wherein said single motor drives only said second differential-control unit of said cables and said first unit comprises for each cable two sets of pulleys for winding the cable without superposition set on respective common horizontal shafts set on top of one another, the shaft of the bottom set of winding pulleys being displaceable vertically with respect to the shaft of the top set of winding pulleys and being operatively associated to a brake and counterweight system.

3. The system according to claim 1, wherein said first unit comprises for each cable two sets of pulleys for winding the cable without superposition set on respective common horizontal shafts set on top of one another, the distance between the common shafts of said two sets of pulleys being variable as a result of the recession of the bottom shaft with respect to the top one via selectively modulatable counterweight means.

4. The system according to claim 2, wherein a displacement of said bottom shaft can be selectively blocked via braking means.

5. The system according to claim 2, wherein said single motor operates first and second return-block means of said cables, which can be displaced in mutually opposite directions and are carried by a first slide and by a second slide respectively, which can be translated in mutually opposite directions and bear respective racks meshing with a gear directly governed in rotation by said single motor.

6. The system according to claim 1, wherein said single motor drives first return-block means and second return-block means for said cables, which can be displaced in mutually opposite directions and are carried by a first slide and by a second slide respectively, which can be translated in mutually opposite directions and bear respective racks meshing with a gear governed in rotation indirectly by said single motor via said energy-accumulation fluidic system.

7. The system according to claim 5, wherein said single motor further includes a third return-block means and fourth return-block means for said cables separate from said first slide and said second slide and set between said first return-block means and second return-block means and said pulleys for winding the cables without superposition.

8. The system according to claim 2, wherein said set between said power kite and said second differential-control unit for controlling the cables is a device for tensioning and damping the oscillations of said cables.

9. The system according to claim 8, wherein said tensioning and damping device includes means for detecting the forces acting on said cables.

10. The system according to claim 7, further comprises clamping means operatively associated to said third and fourth return-block means.

11. The system according to claim 1, wherein each of said cables is connected to the ends of said power kite via at least one pair of bridles wound on respective blocks, and motor-driven actuator means are provided carried by said power kite for varying the length of said at least one pair of bridles selectively.

12. The system according to claim 11, wherein said motor-driven actuator means are designed to vary the length of said at least one pair of bridles so as to modify the angle of attack of said power kite.

13. The system according to claim 1, wherein said power kite is formed by mutually articulated sectors and motor-driven actuator means are provided carried by said power kite for selectively varying the position with respect to one another of said sectors and thus modifying the geometry of said power kite.

14. The system according to claim 13, wherein said mutually articulated sectors are interconnected by cables, a length of said cables being variable via said motor-driven actuator means.

15. The system according to claim 11, wherein said motor-driven actuator means are driven by photovoltaic or wind energy generated on board said power kite.

16. The system according to claim 1, wherein said power kite has a rigid or semi-rigid structure.

17. The system according to claim 1, wherein the power kite is equipped with a take-off/landing train and in that lifting off the ground and recall to the ground of said power kite are performed via said actuation system.

18. The system according to claim 16, wherein said power kite is equipped with at least one auxiliary take-off motor.

19. The system according to claim 3, wherein a displacement of said bottom shaft can be selectively blocked via braking means.

20. An actuating system for controlling the flight of a power wing profile or power kite controlled via at least two cables for conversion of wind energy into electrical or mechanical energy, comprising:

a first unit for exerting an action of equal unwinding-winding of said cables;

a second unit set between said power kite and said first unit for providing an action of differential control of said cables;

a single motor; and wherein said single motor drives only said second differential-control unit of said cables and said first unit comprises for each cable two sets of pulleys for winding the cable without superposition set on respective common horizontal shafts set on top of one another, the shaft of the bottom set of winding pulleys being displaceable vertically with respect to the shaft of the top set of winding pulleys and being operatively associated to a brake and counterweight system.

* * * * *